United States Patent [19]

Aeschlimann et al.

[11] Patent Number: 5,207,801
[45] Date of Patent: May 4, 1993

[54] REACTIVE DYE MIXTURES, PROCESSES FOR THEIR PREPARATION AND THEIR USE: REACTIVE SULFONATED TRI-PHENOL-DIOXAZINE DYE MIXTURE FOR CELLULOSE FIBERS

[75] Inventors: Peter Aeschlimann, Allschwil; Paul Herzig, Basel; Athanassios Tzikas, Pratteln, all of Switzerland

[73] Assignee: Ciba-Geigy Corporation, Ardsley, N.Y.

[21] Appl. No.: 787,991

[22] Filed: Nov. 5, 1991

[30] Foreign Application Priority Data

Nov. 6, 1990 [CH] Switzerland .................. 3512/90

[51] Int. Cl.$^5$ ............... C09B 62/04; C09B 67/22; D06P 1/38; D06P 3/66
[52] U.S. Cl. ................................. 8/549; 8/436; 8/543; 8/638; 8/917; 8/918; 8/924; 8/926
[58] Field of Search ............................ 8/638, 549

[56] References Cited

U.S. PATENT DOCUMENTS

| | | | |
|---|---|---|---|
| 4,591,643 | 5/1986 | Jager | 544/76 |
| 4,705,524 | 11/1987 | Hahnke et al. | 8/527 |
| 4,780,107 | 10/1988 | Sawamoto et al. | 8/657 |
| 4,834,769 | 5/1989 | Dien et al. | 8/436 |
| 5,019,134 | 5/1991 | Ridyard et al. | 8/549 |
| 5,126,450 | 6/1992 | Smith | 8/436 |

FOREIGN PATENT DOCUMENTS 135381  3/1985  European Pat. Off. .

*Primary Examiner*—A. Lionel Clingman
*Attorney, Agent, or Firm*—Marla J. Mathias; Edward McC. Roberts

[57] ABSTRACT

The invention relates to reactive dye mixtures comprising the reactive dyes of the formulae

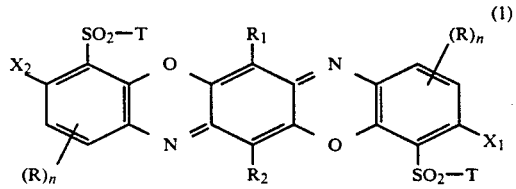

and

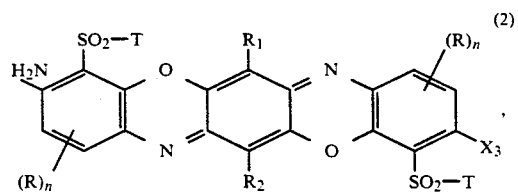

in which $X_1$, $X_2$ and $X_3$ are reactive radicals bonded via a diaminoalkylene bridge and the other substituents are as defined in claim 1.

The reactive dye mixtures are suitable for dyeing and printing cellulosic fibre materials and give wet- and light-fast dyeings in luminous blue shades.

17 Claims, No Drawings

REACTIVE DYE MIXTURES, PROCESSES FOR THEIR PREPARATION AND THEIR USE: REACTIVE SULFONATED TRI-PHENOL-DIOXAZINE DYE MIXTURE FOR CELLULOSE FIBERS

Reactive dyes have been widely used for a long time for dyeing and printing textiles of fibre materials, and a large number of usable reactive dyes with different properties and for various fields of use are now available. In view of the ever higher requirements of reactive dyeings in respect of profitability, application technique and level of fastness, however, the prior art achieved is often not completely satisfactory.

It is thus often to be found, for example, that the degree of fixing is too low and the difference between the degree of exhaustion and degree of fixing is too high (high soap loss), so that a considerable proportion of the reactive dye is lost for the dyeing process. The build-up capacity furthermore leaves something to be desired in many cases.

The present invention was based on the object of discovering novel improved reactive dyes which have a high reactivity and a good build-up capacity, can be used for dyeing with a high fixing yield, are suitable in particular for the exhaust dyeing method and give wet- and light-fast dyeings on cellulosic fibre material.

It has been found that the novel reactive dye mixtures defined below meet these requirements.

The invention relates to reactive dye mixtures comprising the reactive dyes of the formulae

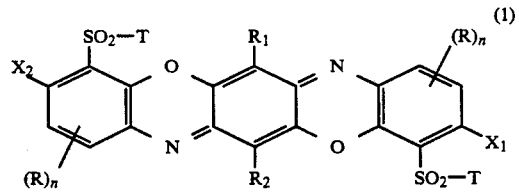

and

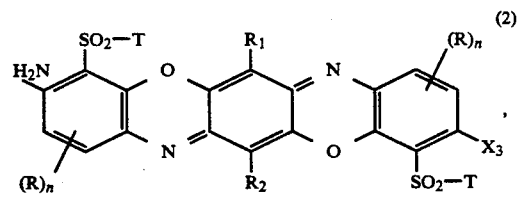

in which $R_1$ and $R_2$ are hydrogen, chlorine, bromine, $C_1$-$C_4$alkyl, $C_1$-$C_4$alkoxy or substituted or unsubstituted phenyl or substituted or unsubstituted phenoxy, $(R)_n$ is n substituents R, which can be, independently of one another, $C_1$-$C_4$alkyl, $C_1$-$C_4$alkoxy, halogen, sulfo, carboxyl, carbamoyl, N-$C_1$-$C_4$alkylcarbamoyl, N,N-di-$C_1$-$C_4$alkylcarbamoyl, $C_1$-$C_4$alkylsulfonyl, sulfamoyl, N-$C_1$-$C_4$alkylsulfamoyl or N,N-di-$C_1$-$C_4$alkylsulfamoyl, n is 0, 1 or 2, T is hydroxyl or $C_1$-$C_6$alkyl, which can be substituted by hydroxyl, carboxyl, sulfo, sulfato, chlorine, $C_1$-$C_4$alkoxy, carbamoyl, sulfamoyl or a radical of the formula

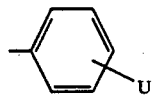

or

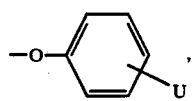

in which U is hydrogen, sulfo, sulfato, hydroxyl or carboxyl, or T is a radical of the formula

in which $R_3$ is hydrogen or substituted or unsubstituted $C_1$-$C_4$alkyl, $R_4$ is hydrogen or $C_1$-$C_6$alkyl, which can be substituted by hydroxyl, carboxyl, sulfo, sulfato, chlorine, $C_1$-$C_4$alkoxy, carbamoyl, sulfamoyl or a radical of the formula (3a) or (3b), in which U is as defined, $X_1$, $X_2$ and $X_3$ independently of one another are each a radical of the formula

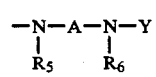

in which $R_5$ and $R_6$ independently of one another are hydrogen or substituted or unsubstituted $C_1$-$C_4$alkyl, A is $C_2$-$C_4$alkylene, which can be substituted by halogen, hydroxyl, carboxyl, sulfo, phenyl, sulfophenyl or $C_1$-$C_4$alkoxycarbonyl, or cyclohexylene, which can be substituted by $C_1$-$C_4$alkyl, or in which the group —N(R$_5$)—A—N(R$_6$)— is 1,4-piperazinediyl, and Y is a reactive radical.

In addition to the abovementioned dyes of the formulae (1) and (2), the mixtures may also contain smaller amounts of compounds of the formula

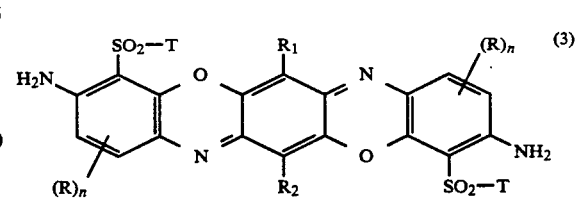

in which the individual substituents are as defined above.

$C_1$-$C_4$Alkyl $R_1$ and $R_2$ is, for example: methyl, ethyl, n-propyl, isopropyl, n-butyl, sec-butyl, isobutyl or tert-butyl.

$C_1$-$C_4$Alkoxy $R_1$ and $R_2$ is, for example: methoxy, ethoxy, n-propoxy, isopropoxy, n-butoxy, sec-butoxy, isobutoxy or tert-butoxy.

A phenyl radical or a phenoxy radical $R_1$ and $R_2$ can be further substituted, for example by halogen, such as fluorine, chlorine or bromine, $C_1$-$C_4$alkyl, such as methyl, ethyl, propyl, isopropyl or butyl, $C_1$-$C_4$alkoxy, such as methoxy or ethoxy, nitro, carboxyl or sulfo.

Possible substituents R are, for example, methyl, ethyl, propyl, isopropyl, butyl, isobutyl, sec-butyl, tert-butyl, methoxy, ethoxy, propyloxy, isopropyloxy, butyloxy, isobutyloxy, sec-butyloxy, tert-butyloxy, fluorine, chlorine, bromine, carboxyl, carbamoyl, N-methylcarbamoyl, N-ethylcarbamoyl, N,N-dimethylcarbamoyl, N,N-diethylcarbamoyl, methylsulfonyl, ethylsulfonyl, sulfamoyl, N-methylsulfamoyl, N-ethylsulfamoyl, N,N-dimethylsulfamoyl or N,N-diethylsulfamoyl.

$C_1$–$C_4$Alkyl $R_3$, $R_5$ and $R_6$ in the formulae (4) and (5) is a straight-chain or branched alkyl radical, which can also be substituted, for example by halogen, hydroxyl, cyano, sulfo or sulfato. Examples are: methyl, ethyl, propyl, isopropyl, butyl, isobutyl, sec-butyl, tert-butyl, $\beta$-chloroethyl, $\beta$-hydroxyethyl, $\beta$-hydroxybutyl, $\beta$-cyanoethyl, sulfomethyl, $\beta$-sulfoethyl or $\beta$-sulfatoethyl.

$C_1$–$C_6$Alkyl T and $R_4$ in the formula (5) is, for example: methyl, ethyl, n-propyl, isopropyl, n-butyl, sec-butyl, isobutyl, tert-butyl or n-hexyl, or the radicals substituted as defined, for example $\beta$-chloroethyl, $\beta$-hydroxyethyl, $\beta$-hydroxybutyl, sulfomethyl, $\beta$-sulfoethyl or $\beta$-sulfatoethyl.

The bridge member A can be straight-chain or branched and further substituted as defined above. Examples of A are: ethylene, 1,2- and 1,3-propylene, 2-hydroxy-1,3-propylene, 2-sulfato-1,3-propylene, 1- and 2-phenyl-1,3-propylene, 2-(4'-sulfophenyl)-1,3-propylene, 1,4-, 2,3- and 2,4-butylene, 2-methyl-1,3-propylene, 1-chloro-2,3-propylene, 2,3-diphenyl-1,4-butylene, 1,3-cyclohexylene, 1,4-cyclohexylene, 4-methyl-1,3-cyclohexylene, 2-methyl-1,3-cyclohexylene, 5,5-dimethyl-1,3-cyclohexylene, 2-methyl-1,4-cyclohexylene, 4,6-dimethyl-1,3-cyclohexylene, 4-methyl-1,2-cyclohexylene or 1,4-piperazinediyl.

Reactive groups Y in the formula (5) which are suitable for the dyeing mixtures according to the invention are, in particular, heterocyclic groups which contain at least one substituent which is bonded to a heterocyclic radical and can be split off, inter alia those which contain at least one reactive substituent bonded to a 5- or 6-membered heterocyclic ring, such as to a monoazine, diazine or triazine ring, for example a pyridine, pyrimidine, pyridazine, pyrazine, thiazine, oxazine or asymmetric or symmetric triazine ring, or to such a ring system which contains one or more fused-on aromatic rings, such as a quinoline, phthalazine, quinazoline, quinoxaline, acridine, phenazine and phenanthridine ring system; the 5- or 6-membered heterocyclic rings which contain at least one reactive substituent are accordingly preferably those which contain one or more nitrogen atoms and can contain 5- or preferably 6-membered fused-on carbocyclic rings.

Reactive substituents on the heterocyclic radical are, for example: halogen (Cl, Br or F), ammonium, including hydrazinium, sulfonium, sulfonyl, azido ($N_3$), thiocyanato, thio, thioether, oxyether, sulfinic acid and sulfonic acid. Specific examples are:

symmetric mono- or dihalogeno-triazinyl radicals, for example 2,4-dichlorotriazin-6-yl, 2-amino-4-chlorotriazin-6-yl, 2-alkyl-amino-4-chlorotriazin-6-yl, such as 2-methylamino-4-chlorotriazin-6-yl and 2-ethylamino- or 3-propylamino-4-chlorotriazin-6-yl, 2-$\beta$-oxyethylamino-4-chlorotriazin-6-yl, 2-di-$\beta$-hydroxyethylamino-4-chlorotriazin-6-yl and the corresponding sulfuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxyl- or -sulfophenyl)-amino-4-chlorotriazin-6-yl, 2-(2',4'-disulfophenyl)-amino-4-chlorotriazin-6-yl or 2-(2',5'-disulfophenyl)-amino-4-chlorotriazin-6-yl, 2-alkoxy-4-chlorotriazin-6-yl, such as 2-methoxy- or -ethoxy-4-chlorotriazin-6-yl, 2-(phenylsulfonylmethoxy)-4-chlorotriazin-6-yl, 2-aryloxy and substituted aryloxy-4-chlorotriazin-6-yl, such as 2-phenoxy-4-chlorotriazin-6-yl, 2-(p-sulfophenyl)-oxy-4-chlorotriazin-6-yl or 2-(o-, m- or p-methyl- or -methoxyphenyl)-oxy-4-chlorotriazin-6-yl, 2-alkylmercapto- or 2-arylmercapto-or 2-(substituted aryl)-mercapto-4-chlorotriazin-6-yl, such as 2-$\beta$-hydroxyethylmercapto-4-chlorotriazin-6-yl, 2-phenylmercapto-4-chlorotriazin-6-yl, 3-(4'-methylphenyl)-mercapto-4-chlorotriazin-6-yl or 2-(2',4'-dinitro)-phenylmercapto-4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or acylamino groups, in which alkyl is, in particular, substituted or unsubstituted $C_1$–$C_4$alkyl, aralkyl is, in particular, substituted or unsubstituted phenyl-$C_1$–$C_4$alkyl, and aryl is, in particular, phenyl or naphthyl which is unsubstituted or substituted by sulfo, alkyl, in particular $C_1$–$C_4$alkyl, alkoxy, in particular $C_1$–$C_4$alkoxy, carboxylic acid and acylamino groups and halogen atoms, such as fluorine, chlorine or bromine, for example 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-$\beta$-methoxyethylamino-4-fluorotriazin-6-yl, 2-$\beta$-hydroxyethylamino-4-fluorotriazin-6-yl, 2-di-($\beta$-hydroxyethylamino)-4-fluorotriazin-6-yl, 2-$\beta$-sulfoethylamino-4-fluorotriazin-6-yl, 2-$\beta$-sulfoethylmethylamino-4-fluorotriazin-6-yl, 2-carboxymethylamino-4-fluorotriazin-6-yl, 2-$\beta$-cyanoethylamino-4-fluorotriazin-6-yl, 2-benzylamino-4-fluorotriazin-6-yl, 2-$\beta$-phenylethylamino-4-fluorotriazin-6-yl, 2-benzylmethylamino-4-fluorotriazin-6-yl, 2-(x-sulfobenzyl)amino-4-fluorotriazin-6-yl, 2-cyclohexylamino-4-fluorotriazin-6-yl, 2-(o-, m- or p-methylphenyl)-amino-4-fluorotriazin-6-yl, 2-(o-, m- or p-sulfophenyl)-amino-4-fluorotriazin-6-yl, 2-(2',5'-disulfophenyl)-amino-4-fluorotriazin-6-yl, 2-(o-, m- or p-chlorophenyl)-amino-4-fluorotriazin-6-yl, 2-(o-, m- or p-methoxyphenyl)-4-fluorotriazin-6-yl, 2-(2'-methyl-4'-sulfophenyl)-amino-4-fluorotriazin-6-yl, 2-(2'-methyl-5'-sulfophenyl)-amino-4-fluorotriazin-6-yl, 2-(2'-chloro-4'-sulfophenyl)-amino-4-fluorotriazin-6-yl, 2-(2'-chloro-5'-sulfophenyl)-amino-4-fluorotriazin-6-yl, 2-(2'-methoxy-4'-sulfophenyl)-amino-4-fluorotriazin-6-yl, 2-(o-, m- or p-carboxyphenyl)-amino-4-fluorotriazin-6-yl, 2-(2',4'-disulfophenyl)-amino-4-fluorotriazin-6-yl, 2-(3',5'-disulfophenyl)-amino-4-fluorotriazin-6-yl, 2-(2'-carboxy-4-sulfophenyl)-amino-4-fluorotriazin-6-yl, 2-(2'-carboxy-4-sulfophenyl)-amino-4-fluorotriazin-6-yl, 2-(6'-sulfonaphth-2'-yl)-amino-4-fluorotriazin-6-yl, 2-(4',8'-disulfonaphth-2'-yl)-amino-4-fluorotriazin-6-yl, 2-(6',8'-disulfonaphth-2'-yl-)-amino-4-fluoro-triazin-6-yl, 2-(N-methylphenyl)-amino-4-fluorotriazin-6-yl, 2-(N-ethylphenyl)-amino-4-fluorotriazin-6-yl, 2-(N-$\beta$-hydroxyethylphenyl)-amino-4-fluorotriazin-6-yl, 2-(N-iso-propylphenyl)-amino-4-fluorotriazin-6-yl, 2-morpholino-4-fluorotriazin-6-yl, 2-piperidino-4-fluorotriazin-6-yl, 2-(4',6',8'-trisulfonaphth-2'-yl)-4-fluorotriazin-6-yl, 2-(3',6',8'-trisulfonaphth-2'-yl)-4-fluorotriazin-6-yl, 2-(3',6',8'-disulfonaphth-1'-yl)-4-fluorotriazin-6-yl, mono-, di- or trihalogenopyrimidinyl radicals, such as 2,4-dichloropyrimidin-6-yl, 2,4,5-trichloropyrimidin-6-yl, 2,4-dichloro-5-nitro or -5-methyl or -5-carboxymethyl or -5-carboxy or -5-cyano or -5-vinyl or -5-sulfo or -5-mono-, -di- or -trichloromethyl or -5-carboalkoxy-pyrimidin-6-yl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methyl-thio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7-or -6-sulfonyl or -carbonyl, 2- or 3- or 4-(4′,5′-dichloro-6′-pyridazin-1′-yl)-phenylsulfonyl or -carbonyl, β-(4′,5′-dichloro-6′-pyridazon-1′-yl)-ethyl-carbonyl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-amino-acetyl, N-methyl-N-(2,3-dichloroquinoxaline-6-sulfonyl)-aminoacetyl-and N-methyl-N-(2,3-dichloroquinoxaline-6-carbonyl)-aminoacetyl, and the corresponding bromine and fluorine derivatives of the abovementioned chlorine-substituted heterocyclic radicals, and amongst these, for example, 2-fluoro-4-pyrimidinyl, 2,6-dichloro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-Fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl or -5-methylsulfonyl-4-pyrimidinyl, 2-fluoro-5-carboxamido-4pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl-, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 6-fluoro-5-chloro-pyrimidin-4-yl, 6-fluoro-5-trifluoromethyl-pyrimidin-4-yl, 6-fluoro-2-methylpyrimidin-4-yl, 6-fluoro-5-chloro-2-methylpyrimidin-4-yl, 5,6-difluoropyrimidin-4-yl, 6-fluoro-5-chloro-2-trifluoromethylpyrimidin-4-yl, 6-fluoro-2-phenylpyrimidin-4-yl, 6-fluoro-5-cyanopyrimidin-4-yl, 6-fluoro-5-nitropyrimidin-4-yl, 6-fluoro-5-methyl-sulfonyl-pyrimidin-4-yl and 6-fluoro-5-phenylsulfonyl-pyrimidin-4-yl, triazine radicals containing sulfonyl groups, such as 2,4-bis-(phenylsulfonyl)-triazin-6-yl, 2-(3′-carboxyphenyl)sulfonyl-4-chlorotriazin-6-yl, 2-(3′-sulfophenyl)-sulfonyl-4-chlorotriazin-6-yl and 2,4-bis-(3′-carboxyphenylsulfonyl)-triazin-6-yl; pyrimidine rings containing sulfonyl groups, such as 2-carboxymethylsulfonyl-pyrimidin-4-yl, 2-methylsulfonyl-6-methylpyrimidin-4-yl, 2-methylsulfonyl-6-ethyl-pyrimidin-4-yl, 2-phenylsulfonyl-5-chloro-6-methyl-pyrimidinyl, 2,6-bis-methylsulfonyl-pyrimidin-4-yl, 2,6-bis-methylsulfonyl-5-chloro-pyrimidin-4-yl, 2,4-bis-methylsulfonyl-pyrimidine-5-sulfonyl, 2-methylsulfonyl-pyrimidin-4-yl, 2-phenyl-sulfonyl-pyrimidin-4-yl, 2-trichloromethylsulfonyl-6-methyl-pyrimidin-4-yl, 2-methylsulfonyl-5-chloro-6-methylpyrimidin-4-yl, 2-methylsulfonyl-5-bromo-6-methyl-pyrimidin-4-yl, 2-methyl-sulfonyl-5-chloro-6-ethyl-pyrimidin-4-yl, 2-methyl-sulfonyl-5-chloro-6-chloromethyl-pyrimidin-4-yl, 2-methylsulfonyl-4-chloro-6-methylpyrimidine-5-sulfonyl, 2-methylsulfonyl-5-nitro-6-methyl-pyrimidin-4-yl, 2,5,6-tris-methylsulfonyl-pyrimidin-4-yl, 2-methylsulfonyl-5,6-dimethylpyridin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carbonyl-pyrimidin-4-yl, 2-methylsulfonyl-5-sulfopyrimidin-4-yl, 2-methyl-sulfonyl-6-carbomethoxy-pyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methyl-pyrimidin-4-yl, 2-methylsulfonyl-5-bromo-pyrimidin-4-yl, 2-phenyl-sulfonyl-5-chloro-pyrimidin-4-yl, 2-carboxymethylsulfonyl-5-chloro-6-methyl-pyrimidin-4-yl, 2-methylsulfonyl-6-chloropyrimidine-4- and -5-carbonyl, 2,6-bis(methylsulfonyl)-pyrimidine-4- and -5-carbonyl, 2-ethylsulfonyl-6-chloropyrimidine-5-carbonyl, 2,4-bis-(methylsulfonyl)-pyrimidine-5-sulfonyl and 2-methylsulfonyl-4-chloro-6-methyl-pyrimidine-5-sulfonyl or -carbonyl, triazine rings containing ammonium groups, such as trimethylammonium-4-phenylamino-or -4-(o-, m- or p-sulfophenyl)-aminotriazin-6-yl, 2-(1,1-dimethylhydrazinium)-4-phenylamino- or -4-(o-, m- or p-sulfophenyl)-aminotriazin-6-yl, 2-(2-isopropylidene-1,1-dimethyl)-hydrazinium-4-phenylamino- or -4-(o-, m- or p-sulfophenyl)-aminotriazin-6-yl, 2-N-aminopyrrolidinium or 2-amino-piperidinium-4-phenylamino- or -4-(o-, m- or p-sulfophenyl)-aminotriazin-6-yl, 2-N-aminopyrrolidinium- or 2-N-aminopiperidinium-4-phenylamino- or -4-(o-, m- or p-sulfophenyl)-aminotriazin-6-yl, and furthermore 4-phenylamino- or 4-(sulfophenylamino)-triazin-6-yl radicals which contain 1,4-bis-azabicyclo-[2,2,2]-octane or 1,2-bis-aza-bicyclo-[0,3,3]-octane bonded in quaternary form via a nitrogen bond in the 2-position, and 2-pyridinium-4-phenylamino- or 4-(o-, m- or p-sulfophenyl)-aminotriazin-6-yl and the corresponding 2-oniumtriazin-6-yl radicals which are substituted in the 4-position by alkylamino, such as methylamino, ethylamino or β-hydroxyethylamino, or alkoxy, such as methoxy or alkoxy, or aryloxy, such as phenoxy or sulfophenoxy groups; 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methylsulfonyl- or 2-ethylsulfonylbenzothiazole-5- or -6-sulfonyl or -carbonyl, 2-phenylsulfonyl-benzothiazole-5- or -6-sulfonyl or -carbonyl and the corresponding 2-sulfonyl-benzothiazole-5- or -6-carbonyl or -sulfonyl derivatives containing sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5-or -6-carbonyl or -sulfonyl, 2-chloro-4-methyl-1,3-thiazole-5-carbonyl or -4- or -5-sulfonyl, the N-oxide of 4-chloro- or 4- nitroquinoline-5-carbonyl or the radicals 5-chloro-2,6-difluoro-1,3-dicyanophenyl, 2,4-difluoro-1,3,5-triacyanophenyl, 2,4,5-trifluoro-1,3-dicyanophenyl, 2,4-dichloro-5-methylsulfonyl-pyrimidin-6-yl, 2,4-trichloro-5-ethylsulfonyl-pyrimidin-6-yl, 2-fluoro-5-methylsulfonyl6'-(2'-sulfophenylamino)-pyrimidin-4-yl and 2,5-dichloro-6-methylsulfonylpyrimidin-4-yl.

Reactive groups of the aliphatic series are furthermore to be mentioned, such as acryloyl, mono-, di- or trichloroacryloyl, such as —CO—CH=CH—Cl, —CO—CCl=CH$_2$ and —CO—CCl=CH—CH$_3$, and furthermore —CO—CCl=CH—COOH, —CO—CH=CCl—COOH, and β-chloropropionyl, 3-phenylsulfonylpropionyl, 3-methylsulfonylpropionyl, 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobut-1-yl)-aryloxy, α- or β-bromoacryloyl or an α-or β-alkyl- or -arylsulfonylacryloyl group, such as α- or β-methanesulfonylacryloyl and chloroacetyl.

Preferred reactive dye mixtures consisting essentially of the reactive dyes of the formulae (1) and (2) are those in which a) n is 0; or
b) $R_1$ and $R_2$ are chlorine atoms; or
c) T is a radical of the formula

  —CH$_2$—CH$_2$—OSO$_3$H                 (6a),

  —CH$_2$—CH$_2$—SO$_3$H                  (6b),

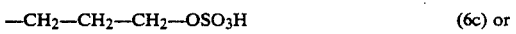  —CH$_2$—CH$_2$—CH$_2$—OSO$_3$H          (6c) or

  —CH$_2$—CH$_2$—CH$_2$—CH$_2$—OSO$_3$H   (6d); or d) A is ethylene, 1,2-propylene, 1,3-propylene, 2-hydroxy-1,3-propylene,
2-sulfato-1,3-propylene, 1-phenyl-1,3-propylene, 2-phenyl-1,3-propylene,
2-(4'-sulfophenyl)-1,3-propylene, 2-methyl-1,3-propylene or 1,4-butylene; or
e) Y is a halogenopyrimidine or halogenotriazine radical; or
f) n is 0 and $R_1$ and $R_2$ are chlorine atoms; or
g) n is 0, $R_1$ and $R_2$ are chlorine atoms and T is as defined under c); or
h) n, $R_1$, $R_2$ and T are as defined under g) and Y is a halogenopyrimidine or halogenotriazine radical.

Particularly preferred reactive dye mixtures are those consisting essentially of the reactive dyes of the formulae (1) and (2) according to d) in which A is ethylene, 1,2-propylene, 1,3-propylene or 2-sulfato-1,3-propylene.

Especially preferred reactive dye mixtures are those consisting essentially of the reactive dyes of the formulae (1) and (2), in particular the reactive dyes according to (a) to (g), in which $X_1$, $X_2$ and $X_3$ are each a radical of the formula

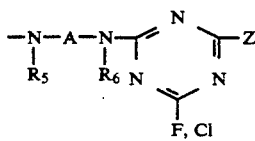

(7)

in which $R_5$, $R_6$ and A are as defined and Z is —NH$_2$ or a substituted amino group.

Substituted amino groups Z are: alkylamino, N,N-dialkylamino, cycloalkylamino, N,N-dicycloalkylamino, aralkylamino and arylamino groups, amino groups with mixed substituents, such as N-alkyl-N-cyclohexylamino and N-alkyl-N-arylamino groups, and furthermore amino groups which contain heterocyclic radicals which can contain further fused-on carbocyclic rings, as well as amino groups in which the amino nitrogen atom is a member of a N-heterocyclic ring which may or may not contain further hetero atoms. The abovementioned alkyl radicals can be straight-chain or branched and of low molecular weight or higher molecular weight, alkyl radicals having 1 to 6 carbon atoms being preferred; cycloalkyl, aralkyl and aryl radicals are, in particular, cyclohexyl, benzyl, phenethyl, phenyl and naphthyl radicals; heterocyclic radicals are, in particular, furan, thiophene, pyrazole, pyridine, pyrimidine, quinoline, benzimidazole, benzothiazole and benzoxazole radicals; and amino groups in which the amino nitrogen atom is a member of a N-heterocyclic ring are preferably radicals of 6-membered N-heterocyclic compounds, which can contain nitrogen, oxygen and sulfur as further hetero atoms. The abovementioned alkyl, cycloalkyl, aralkyl and aryl radicals, the heterocyclic radicals and the N-heterocyclic rings can be further substituted, for example by: halogen, such as fluorine, chlorine and bromine, nitro, cyano, trifluoromethyl, sulfamoyl, carbamoyl, $C_1$–$C_4$alkyl, $C_1$–$C_4$alkoxy, acylamino groups, such as acetylamino, ureido, hydroxyl, carboxyl, sulfomethyl, sulfo and sulfato.

Examples of the amino radical Z in formula (7) are: —NH$_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfphenylamino, N-ethyl-4-sulfophenylamino, phenylamino, toluidino, xylidino, chloroanilino, anisidino, phenetidino, 2-, 3- and 4-sulfoanilino, 2,5-disulfoanilino, sulfomethylanilino, N-sulfomethylanilino, 3- and 4-carboxyphenylamino, 2-carboxy-5-sulfophenylamino, 2-carboxy-4-sulfophenylamino, 4-sulfonaphth-1-yl-amino, 3,6-disulfonaphth-1-yl-amino, 3,6,8-trisulfonaphth-1-yl-amino, 4,6,8-trisulfonaphth-2-yl-amino, 6-sulfonaphth-2-yl-amino, pyrid-2-yl-amino, morpholino, piperidino and piperazino.

Reactive dye mixtures which are furthermore important are those consisting essentially of the reactive dyes of the formulae (1) and (2) in which $X_1$, $X_2$ and $X_3$ are each a radical of the formula

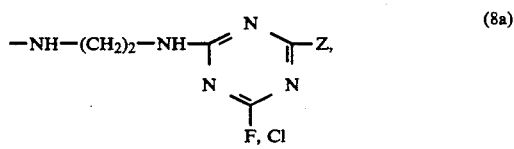

(8a)

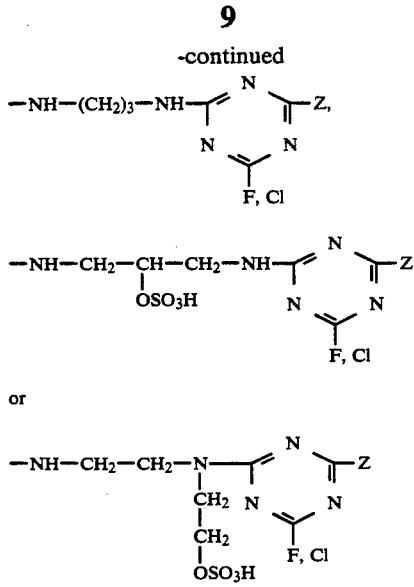

in which Z is —NH₂ or a substituted amino group.

Z in formula (7), (8a), (8b), (8c) and (8d) is, in particular, —NH₂, C₁-C₄alkylamino, which can be substituted by hydroxyl or sulfo, N,N-di-C₁-C₄alkylamino, which can be substituted by hydroxyl, phenylamino, which can be substituted by C₁-C₄alkyl, C₁-C₄alkoxy, halogen, hydroxyl, ureido, acetylamino, carboxyl, sulfo or sulfomethyl, N-C₁-C₄alkyl-N-phenylamino, which can be substituted in the alkyl radical by halogen, cyano, hydroxyl, carboxyl, sulfo or sulfato and in the phenyl radical by C₁-C₄alkyl, C₁-C₄alkoxy, halogen, hydroxyl, ureido, acetylamino, carboxyl, sulfo or sulfomethyl, sulfonaphthylamino or morpholino.

Z in the formulae (7), (8a), (8b), (8c) and (8d) is especially a radical of the formula

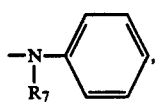

in which R₇ is hydrogen or C₁-C₄alkyl, which can be substituted by halogen, cyano, hydroxyl, carboxyl, sulfo or sulfato, and the phenyl ring can be substituted by methyl, methoxy, ethoxy, chlorine, hydroxyl, ureido, acetylamino, carboxyl or sulfo.

Reactive dye mixtures which are particularly important are those consisting essentially of the reactive dyes of the formulae

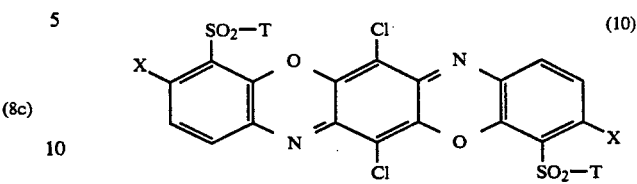

and

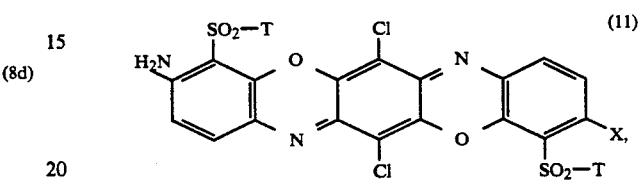

in which T is one of the radicals of the formulae (6a), (6b), (6c) or (6d) and X is one of the radicals of the formulae (7), (8a), (8b), (8c) or (8d), preferably in which X is one of the radicals of the formulae (7), (8a), (8b), (8c) or (8d), and the halogen on the triazine ring is a fluorine atom.

Reactive dye mixtures which are especially important are those consisting essentially of the reactive dyes of the formula

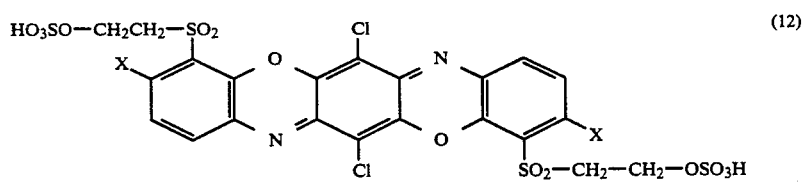

and

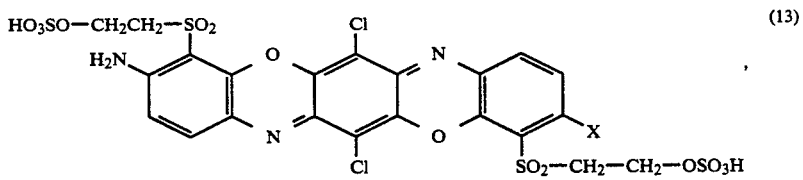

in which X is a radical of the formula

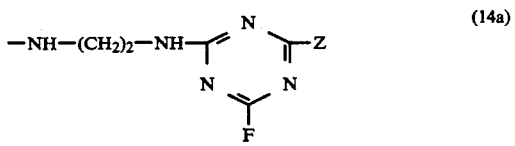

or

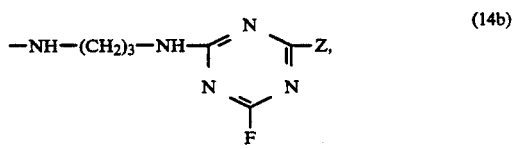

and Z is β-sulfatoethylamino, m-sulfophenylamino, p-sulfophenylamino, 2,4-disulfophenylamino or 2,5-disulfophenylamino.

The invention furthermore relates to a process for the preparation of the reactive dye mixtures comprising the reactive dyes of the formulae (1) and (2), which comprises subjecting compounds of the formula

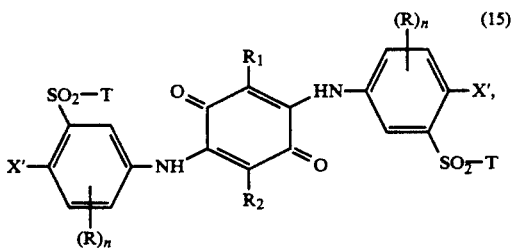

in which $R_1$, $R_2$, R, n and T are as defined under the formulae (1) and (2) and X' is a radical of the formula

in which A, $R_5$ and $R_6$ are as defined under the formulae (1) and (2), to a ring closure reaction in oleum at elevated temperature, and reacting the resulting mixture comprising the compounds of the formulae

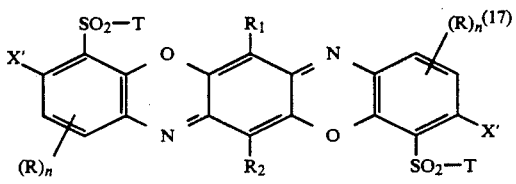

and

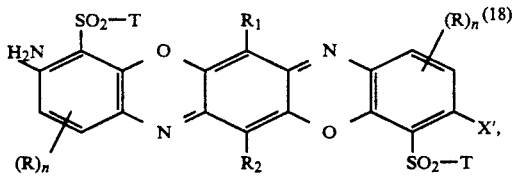

in which $R_1$, $R_2$, R, n, T and X' are as defined, with fibre-reactive compounds which contain a radical Y, in particular those of the formula

so that a mixture of reactive dyes of the formulae (1) and (2), which may contain smaller amounts of the compound (3), is formed.

The present invention furthermore relates to a process for the preparation of the reactive dye mixtures according to the invention, which comprises mixing the reactive dyes of the formulae (1) and (2) with one another in any ratio. The mixing ratios are those in which the weight ratio of the dyes of the formulae (1) and (2) is 10:90 to 90:10, preferably 30:70 to 70:30. The reactive dyes of the formulae (1) and (2) can be prepared by methods known per se.

If the reactive radical Y is a halogenotriazine radical, a halogen atom on the triazine ring can be replaced by an amino, alkoxy, aryloxy, alkylthio or arylthio radical by prior or subsequent condensation with an amino, hydroxy or mercapto compound. Examples of such amino, hydroxy and mercapto compounds are the following:

ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, phenethylamine, cyclohexylamine, N-methylaminobenzene, N-ethylaminobenzene, N-propylaminobenzene, N-isopropylaminobenzene, N-butylaminobenzene, N-isobutylaminobenzene, N-sec-butylaminobenzene, N-hexylaminobenzene, N-β-hydroxyethylaminobenzene, N-β-chloroethylaminobenzene, N-β-cyanoethylaminobenzene, N-β-sulfoethylaminobenzene, 1-(N-ethylamino)-2-, -3- or -4-methylbenzene, 1-(N-ethylamino)-2-, -3- or -4-ethylbenzene, 1-(N-ethylamino)-2-, -3-or -4-chlorobenzene, 1-N-ethylaminobenzene-3- or -4-sulfonic acid, 1-(N-ethylamino)-4-butylbenzene, 1-(N-ethylamino)-4-hexylbenzene, 1-(N-ethylamino)-4-octylbenzene, 1-(N-ethylamino)-4-vinylbenzene, 1-N-n-butylamino-3-methylbenzene, 1-(N-ethylamino)-4-fluorobenzene, aniline, o-, m- and p-toluidine, 2,3-, 2,4-, 2,5-, 2,6-, 3,4- and 3,5-dimethylaniline, o-, m- and p-chloraniline, N-methylaniline, N-ethylaniline, 3- or 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoaniline, 3-aminobenzamide, 4-aminophenylsulfamide, 3-trifluoromethylaniline, 3- and 4-aminophenylsulfamide, 3-trifluoromethylaniline, 3- and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7-and -8-sulfonic acid, 2-naphthylamino-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzothiazole, 5-, 6- and 8-aminoquinoline, 2-aminopyrimidine, morpholine, piperidine, piperazine, water, methanol, ethanol, propanol, isopropanol, n-butanol, isobutanol, sec-butanol, tert-butanol, hexanol, cyclohexanol, β-methoxyethanol, β-ethoxyethanol, γ-methoxypropanol, γ-ethoxypropanol, β-ethoxy-β-ethoxyethanol, glycolic acid, phenol, o-, m- and p-chlorophenol, methanethiol, ethanethiol, propanethiol, isopropanethiol, n-butanethiol, thioglycolic acid, thiourea, thiophenol, α-thionaphthol and β-thionaphthol.

The individual process steps for the preparation of such triazine dyes can be carried out in various sequences, and if appropriate in some cases also at the same time. Various process variants are possible. The reaction is in general carried out stepwise in succession.

Which of the possible process variants gives the best results or under which specific conditions, for example at which condensation temperature, the reaction is most advantageously to be carried out depends here on the and subjecting the mixture comprising the compounds of the formulae

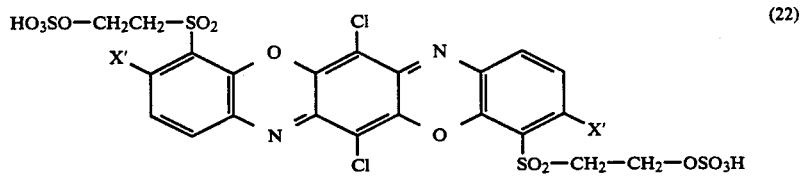

and

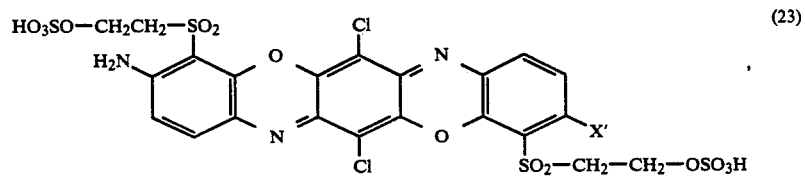

structure of the starting substances.

Important process variants comprise:

1. Subjecting dioxazine compounds of the formulae (17) and (18) in which X' is a radical of the formula (16) to a condensation reaction with a 2,4,6-trihalogeno-s-triazine and subjecting the resulting condensation product to condensation with 1 mol of an amine.

2. Subjecting a 2,4,6-trihalogeno-s-triazine radical to a monocondensation reaction with an amine and subjecting the resulting intermediate compound to a condensation reaction with dioxazine compounds of the formulae (17) and (18) in which X' is a radical of the formula (16) in a molar ratio of 1:1.

The condensation of the halogenotriazines with the amino, hydroxy or mercapto compounds mentioned is carried out in a manner known per se, preferably in the presence of alkaline agents.

The reaction of the chloranil compound, which is known per se, of the formula (15) in which X' is a radical of the formula (16) to give the mixture of the compounds of the formulae (17) and (18) is carried out, in particular, in oleum at preferably 25° to 100° C., the reaction being started, in particular, at 30° to 50° C. and the temperature then being increased to 75° to 100° C. Partial splitting off of one of the two H₂N—A groups takes place because of the higher temperature during the cyclisation reaction.

The preferred preparation procedure for the reactive dye mixture consisting essentially of the reactive dyes of the formulae (12) and (13) in which X is a radical of the formula (14a) or (14b) comprises starting from a compound of the formula in which X' is as defined, obtained by cyclisation to a condensation reaction with a compound of the formula

in which Z is β-sulfatoethylamino, m-sulfophenylamino, p-sulfophenylamino, 2,4-disulfophenylamino or 2,5-disulfophenylamino.

The condensation of the 2,4,6-trifluoro-s-triazine with the dioxazine compounds of the formulae (17) and (18) is preferably carried out in aqueous solution or suspension at low temperatures, preferably between 0° and 5° C., and at weakly acid, neutral to weakly alkaline pH. The hydrogen fluoride liberated during the condensation is advantageously neutralised continuously by addition of aqueous alkali metal hydroxides, carbonates or bicarbonates. The free amines or salts thereof, preferably in the form of the hydrochloride, are employed for the further reaction of the fluorotriazine dyes thus obtained or for the reaction of the 2,4,6-trifluoro-s-triazine with amines. The reaction is carried out at temperatures between about 0° and 40° C., preferably between 5° and 25° C., with addition of acid-binding agents, preferably sodium carbonate, in a pH range of 2 to 8, preferably 5 to 6.5.

The condensation of the fluorotriazine with an amine

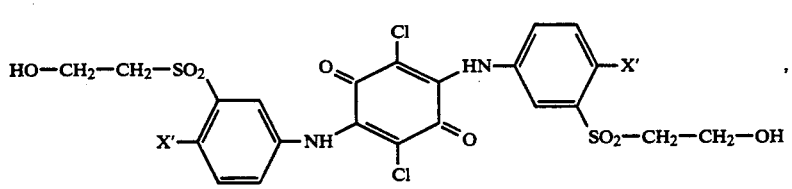

in which X' is a radical of the formula

 (21a) or

 (21b)

can be carried out before or after the condensation of the fluorotriazine with the mixture of dioxazines of the formulae (17) and (18). The condensation of the fluorotriazine with an amine is preferably carried out in aqueous solution or suspension at a low temperature and at a weakly acid to neutral pH. Here also, the hydrogen fluoride liberated during the condensation is advantageously neutralised by continuous addition of aqueous alkali metal hydroxides, carbonates or bicarbonates.

The dioxazine compounds of the formulae (17) and (18), in which X' is as defined, used as starting substances are prepared in the customary manner from the anil of the formula (15) by cyclisation.

The reactive dye mixtures consisting essentially of the reactive dyes of the formulae (1) and (2) can be isolated and processed to usable, dry dyeing preparations. They are preferably isolated at the lowest possible temperatures by salting out and filtration. The filtered dyes can be dried, if appropriate after addition of diluents and/or buffers, for example after addition of a mixture of equal parts of mono- and disodium phosphate; the drying is preferably carried out at temperatures which are not too high and under reduced pressure. In certain cases, the dry preparations according to the invention can be prepared directly, i.e. without intermediate isolation of the dyes, by spray drying the entire preparation mixture.

The reactive radical Y contains a substituent which is or contains a fibre-reactive leaving group, or which can become active in the manner of fibre-reactive leaving groups. Fibre-reactive compounds are to be understood as meaning those which are capable of reacting with the hydroxyl groups of cellulose, the amino, carboxyl, hydroxyl and thiol groups of wool and silk or the amino and, if appropriate, carboxyl groups of synthetic polyamides to form a covalent chemical bond.

The reactive dye mixtures according to the invention are suitable for dyeing and printing the most diverse materials, such as silk, leather, wool, polyamide fibres and polyurethanes, and in particular all types of cellulosic fibre materials. Examples of such fibre materials are the naturally occurring cellulose fibres, such as cotton, linen and hemp, and cellulose and regenerated cellulose. The reactive dye mixtures according to the invention are also suitable for dyeing or printing fibres which contain hydroxyl groups and are contained in blend fabrics, for example mixtures of cotton with polyester fibres or polyamide fibres.

The dye mixtures according to the invention can be applied to the fibre material and fixed to the fibre in various ways, in particular in the form of aqueous dye solutions and printing pastes.

They are suitable both for the exhaust method and for dyeing by the pad-dyeing process, in which the goods are impregnated with aqueous, if appropriate salt-containing dye solutions and, after treatment with alkali or in the presence of alkali, the dyes are fixed, if appropriate under the action of heat. They are particularly suitable for the so-called cold pad-batch process, in which the dye is applied on the padder together with the alkali and is then fixed by storage at room temperature for several hours. After fixing, the dyeings and prints are rinsed thoroughly with cold and hot water, if appropriate with the addition of a dispersing agent which promotes diffusion of the non-fixed portions.

The reactive dye mixtures according to the invention are distinguished by a high reactivity and good fixing capacity. They can therefore be used by the exhaust dyeing method at low dyeing temperatures and require only short steaming times in the pad-steam process. The degrees of fixing are high and the non-fixed portions can easily be washed out, the difference between the degree of exhaustion and degree of fixing being remarkably small, i.e. the soap loss is very low. The dye mixtures are also suitable for printing, in particular on cotton, but also for printing on fibres containing nitrogen, for example wool, silk or blend fabrics containing wool.

The dyeings and prints produced on cellulose fibre materials with the dye mixtures according to the invention have a high tinctorial strength and a high fibre-dye bonding stability, both in the acid and in the alkaline range, and furthermore a good fastness to light and very good wet-fastness properties, such as fastness to washing, water, sea water, crossdyeing and perspiration, as well as a good fastness to pleating, fastness to ironing and fastness to rubbing.

The examples which follow serve to illustrate the invention. The temperatures are given in degrees Celsius, parts are parts by weight and the percentages are by weight, unless stated otherwise. Parts by weight bear the same relation to parts by volume as the kilogram to the liter. The preparation of the intermediate compound is not described in all cases in the following embodiment examples, but can easily be seen from the general description.

EXAMPLE 1

35.6 parts of the chloranil condensation product of the formula

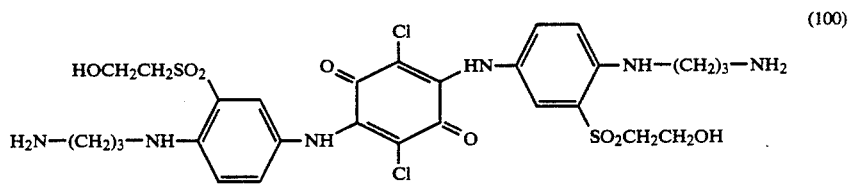

(100)

are introduced into 1600 parts of oleum (24%) in the course of about 40 minutes. The temperature rises to about 40° and an olive-brown solution is formed. The reaction mixture is heated to 80° in the course of 15 minutes and kept at this temperature for about 6 minutes. A deep blue solution is formed. The oleum solution is then cooled to room temperature and poured onto 4000 parts of ice. 2500 parts of a 10N sodium hydroxide solution are then added dropwise in the course of 60 minutes, while cooling with ice. A clear solution forms, from which the resulting product is isolated with 300 parts of NaCl. As a result of the partial splitting off of one of the two $H_2N-(CH_2)_3$ groups which takes place in the starting substance of the compound of the formula (100) at an elevated reaction temperature, a mixture of the compounds of the formulae

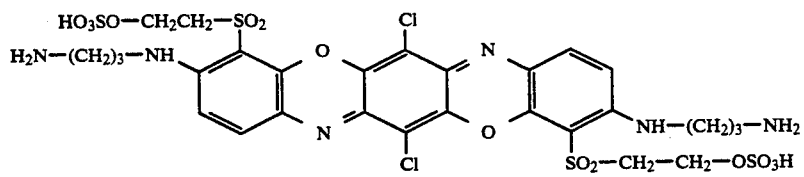

(101)

and

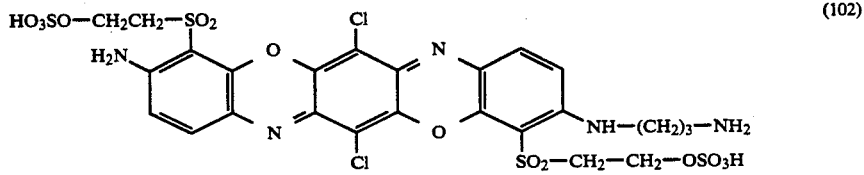

(102)

is thus present after the cyclisation reaction.

18 parts of the dye mixture thus obtained are stirred into 200 parts of water and the pH is brought to 8 with sodium hydroxide solution. 200 parts of a neutral aqueous solution which contains 18 parts of the primary condensation product of cyanuric fluoride and aniline-2,5-disulfonic acid are then added to the resulting suspension. The condensation reaction is carried out at room temperature and the pH is kept at about 8 with 1N sodium hydroxide solution. After complete acylation of the aliphatic amino group, the dye is isolated with sodium chloride, filtered off and dried in vacuo.

The dye mixture thus obtained contains the dyes of the formulae of the formulae (101) and (102) in which a radical $-SO_2CH_2CH_2SO_3H$, $-SO_2CH_2CH_2CH_2OSO_3H$ or $-SO_2CH_2CH_2CH_2CH_2OSO_3H$ is present instead of the radical $-SO_2CH_2CH_2CH_2OSO_3H$ are used in the compound of the formula (100), or if a corresponding amount of the primary condensation product of cyanuric fluoride and one of the amines listed below is used for acylation of the aliphatic amino groups.

| Example | Amines |
|---|---|
| 2 | Ammonia |
| 3 | Methylamine |
| 4 | Ethylamine |
| 5 | n-Propylamine |

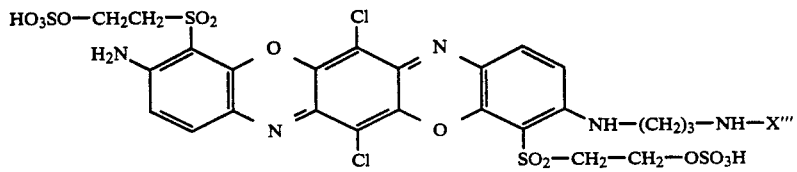

(103)

and

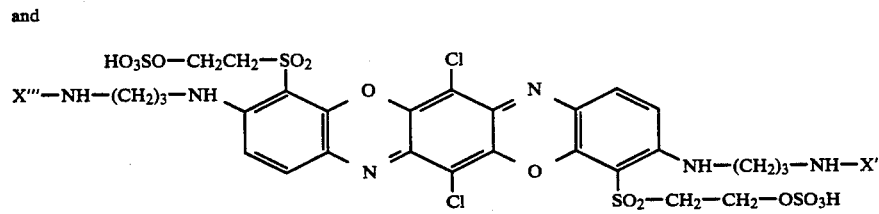

(104)

in which X''' is the radical of the formula

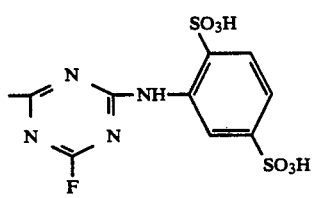

The resulting dye mixture dyes cotton in pure blue shades.

If an equivalent amount of 2-methylaniline-5-sulfonic acid is used instead of aniline-2,5-disulfonic acid, a dye mixture with similar properties is obtained.

Further dye mixtures are obtained if, in the above example, those compounds which lead to dye mixtures

| 6 | n-Butylamine |
|---|---|
| 7 | Dimethylamine |
| 8 | Diethylamine |
| 9 | Ethanolamine |
| 10 | Diethanolamine |
| 11 | β-Sulfatoethylamine |
| 12 | Taurine |
| 13 | Aniline |
| 14 | N-Methylaniline |
| 15 | N-Ethylaniline |
| 16 | o-Toluidine |
| 17 | m-Toluidine |
| 18 | p-Toluidine |
| 19 | m-Chloraniline |
| 20 | p-Chloraniline |
| 21 | o-Anisidine |
| 22 | p-Anisidine |
| 23 | p-Phenetidine |
| 24 | p-Aminobenzoic acid |
| 25 | N-Methyl-taurine |
| 26 | 4-Aminoacetanilide |

-continued

| Example | Amines |
|---|---|
| 27 | 3-Aminophenylurea |
| 28 | 4-Aminophenylurea |
| 29 | Anthranilic acid |
| 30 | m-Aminobenzoic acid |
| 31 | Morpholine |
| 32 | 2-Naphthylamine-6-sulfonic acid |
| 33 | 4-Aminosalicylic acid |
| 34 | Orthanilic acid |
| 35 | Metanilic acid |
| 36 | Sulfanilic acid |
| 37 | Aniline-2,4-disulfonic acid |
| 38 | Aniline-3,5-disulfonic acid |
| 39 | 4-Methylaniline-2,5-disulfonic acid |
| 40 | 4-Methoxyaniline-2,5-disulfonic acid |
| 41 | 2-Naphthylamine-1-sulfonic acid |
| 42 | 2-Naphthylamine-1,5-disulfonic acid |
| 43 | 2-Naphthylamine-6,8-disulfonic acid |
| 44 | 2-Naphthylamine-4,8-disulfonic acid |
| 45 | 1-Naphthylamine-2,4,8-trisulfonic acid |
| 46 | 1-Naphthylamine-2,5,7-trisulfonic acid |
| 47 | 1-Naphthylamine-3,6,8-trisulfonic acid |
| 48 | 1-Naphthylamine-4,6,8-trisulfonic acid |
| 49 | 2-Naphthylamine-1,5,7-trisulfonic acid |
| 50 | 2-Naphthylamine-3,6,8-trisulfonic acid |

If the cyanuric fluoride in Examples 1 to 50 is replaced by an equimolar amount of cyanuric chloride, dye mixtures which dye cellulose fibres in blue shades are likewise obtained.

If, instead of the mixture of dyes of the formulae (101) and (102), which contain 1,3-diaminopropane bridge members, described in Example 1, analogously prepared mixtures of compounds of the formulae

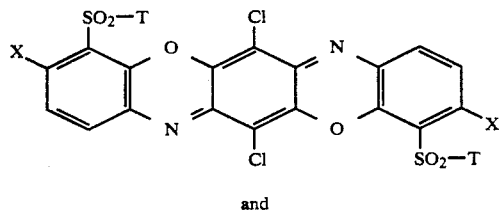

and

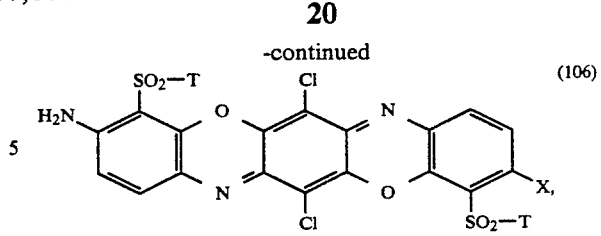

(106)

in which X is a radical

—NH—(CH$_2$)$_2$—NH$_2$,

—NH—CH$_2$—CH(CH$_3$)—NH$_2$,

—NH—(CH$_2$)$_2$—NHCH$_3$,

—NH—(CH$_2$)$_2$—NHC$_2$H$_5$,

—NH—(CH$_2$)$_3$—NHCH$_3$,

—NH—(CH$_2$)$_3$—NHC$_2$H$_5$,

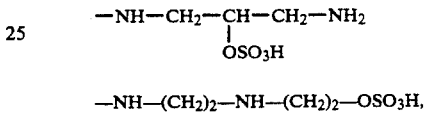

—NH—(CH$_2$)$_2$—NH—(CH$_2$)$_2$—OSO$_3$H, and T is in each case one of the radicals

—CH$_2$—CH$_2$—OSO$_3$H,

—CH$_2$—CH$_2$—SO$_3$H,

—CH$_2$—CH$_2$—CH$_2$—OSO$_3$H,

—CH$_2$—CH$_2$—CH$_2$—CH$_2$—OSO$_3$H are used and these are reacted with the primary condensation products of cyanuric fluoride or cyanuric chloride and the amines mentioned in Examples 1 to 50, further dye mixtures which dye cellulose fibres in blue shades with good fastness properties are obtained.

If the anil of the formula (100) used as the starting compound is structurally modified and the procedure is otherwise according to the statements of Example 1, a mixture of, for example, 2,9-dichlorotriphendioxazines which have a radical —SO$_2$CH$_2$CH$_2$SO$_3$H instead of the radical —SO$_2$CH$_2$CH$_2$OSO$_3$H in the 4-and 11-position is obtained:

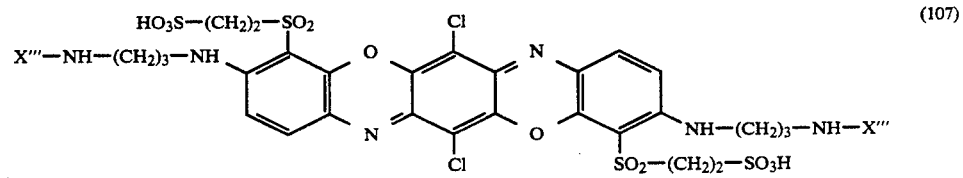

and

-continued

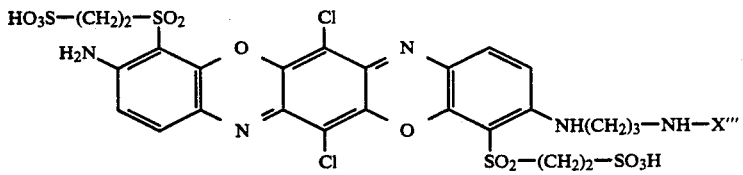
(108)

in which X''' is the radical of the formula

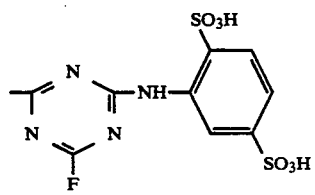

and useful dye mixtures which dye cellulose fibres in blue shades are likewise thus obtained.

Dyeing instructions 1

2 parts of the dye mixture obtained according to Example 1 are dissolved in 100 parts of water at 20° to 50° C., with the addition of 5 to 20 parts of urea and 2 parts of anhydrous $Na_2CO_3$. A cotton fabric is impregnated with the resulting solution, squeezed off to a weight increase of 60 to 80% and then dried. The dyeing is then thermofixed at 140° to 210° C. for $\frac{1}{2}$ to 5 minutes, subsequently soaped in a 0.1% boiling solution of an ion-free detergent for quarter of an hour and rinsed and dried.

Dyeing instructions 2

2 parts of the dye mixture obtained according to Example 1 are dissolved in 100 parts of water, with the addition of 0.5 part of sodium m-nitrobenzenesulfonate. A cotton fabric is impregnated with the resulting solution, squeezed off to a weight increase of 75% and then dried.

The fabric is then impregnated with a solution, warmed to 20° C., which contains 5 grams of sodium hydroxide and 300 grams of sodium chloride per liter, and is squeezed off to a weight increase of 75%, and the dyeing is steamed at 100° to 101° for 30 seconds, soaped in a 0.3% boiling solution of an ion-free detergent for quarter of an hour, rinsed and dried.

Dyeing instructions 3

2 parts of the dye mixture obtainable according to Example 1 are dissolved in 100 parts of water.

The solution is added to 1900 parts of cold water, 60 parts of sodium chloride are added, and 100 parts of a cotton fabric are introduced into this dye bath.

The temperature is increased to 60° C., 40 parts of anhydrous $Na_2CO_3$ and a further 60 parts of sodium chloride being added after 30 minutes. The temperature is kept at 60° C. for 30 minutes and the dyeing is then rinsed, soaped in a 0.3% boiling solution of an ion-free detergent for 15 minutes, rinsed and dried.

Dyeing instructions 4

4 parts of the reactive dye mixture prepared in Example 1 are dissolved in 50 parts of water. 50 parts of a solution which contains 5 g of sodium hydroxide and 10 g of anhydrous $Na_2CO_3$ per liter are added. A cotton fabric is padded with the resulting solution, squeezed off to a weight increase of 70% and then wound onto a roll. The cotton fabric is kept at room temperature in this way for 3 to 12 hours. The dyed goods are then rinsed, soaped at the boil with a nonionic detergent for quarter of an hour, rinsed again and dried. A blue dyeing with good fastness properties is obtained.

What is claimed is:

1. A reactive dye mixture comprising the reactive dyes of the formulae

and

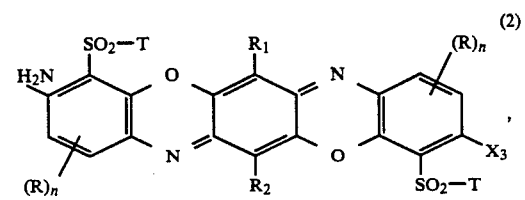

wherein dyes of formulae (1) and (2) are in a ratio between 10:90 and 90:10, and in which $R_1$ and $R_2$ are hydrogen, chlorine, bromine, $C_1$-$C_4$alkyl, $C_1$-$C_4$alkoxy or substituted or unsubstituted phenyl or substituted or unsubstituted phenoxy;

$(R)_n$ is n substituents R, which can be, independently of one another, $C_1$-$C_4$alkyl, $C_1$-$C_4$alkoxy, halogen, sulfo, carboxyl, carbamoyl, N-$C_1$-$C_4$alkylcarbamoyl, N,N-di-$C_1$-$C_4$alkylcarbamoyl, $C_1$-$C_4$alkylsulfonyl, sulfamoyl, N-$C_1$-$C_4$alkylsulfamoyl or N,N-di-$C_1$-$C_4$alkylsulfamoyl;

n is 0, 1 or 2;

T is hydroxyl or $C_1$-$C_6$alkyl, which can be substituted by hydroxyl, carboxyl, sulfo, sulfato, chlorine, $C_1$-$C_4$alkoxy, carbamoyl, sulfamoyl or a radical of the formula

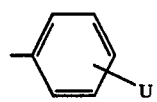
(3a)

or

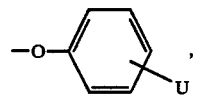
(3b)

in which U is hydrogen, sulfo, sulfato, hydroxyl or carboxyl; or

T is a radical of the formula

in which

R$_3$ is hydrogen or substituted or unsubstituted C$_1$-C$_4$alkyl;

R$_4$ is hydrogen or C$_1$-C$_6$alkyl, which can be substituted by hydroxyl, carboxyl, sulfo, sulfato, chlorine, C$_1$-C$_4$alkoxy, carbamoyl, sulfamoyl or a radical of the formula (3a) or (3b), in which U is as defined;

X$_1$, X$_2$ and X$_3$ independently of one another are each a radical of the formula

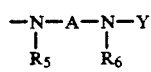

in which

R$_5$ and R$_6$ independently of one another are hydrogen or substituted or unsubstituted C$_1$-C$_4$alkyl;

A is C$_2$-C$_4$alkylene, which can be substituted by halogen, hydroxyl, carboxyl, sulfo, phenyl, sulfophenyl or C$_1$-C$_4$alkoxycarbonyl, or cyclohexylene, which can be substituted by C$_1$-C$_4$alkyl; or in which the group —N(R$_5$)—A—N(R$_6$)— is 1,4-piperazinediyl; and Y is a fiber-reactive halogenopyrimidine or halogenotriazine radical.

2. A reactive dye mixture consisting essentially of the reactive dyes of the formulae

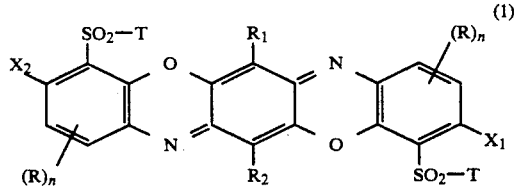

and

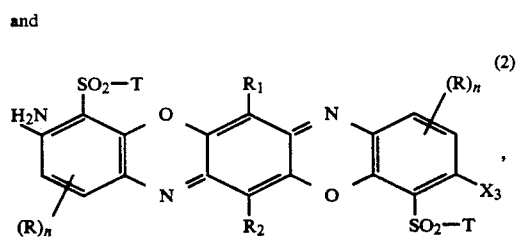

wherein dyes of formulae (1) and (2) are in a ratio between 10:90 and 90:10, and in which R$_1$ and R$_2$ are hydrogen, chlorine, bromine, C$_1$-C$_4$alkyl, C$_1$-C$_4$alkoxy or substituted or unsubstituted phenyl or substituted or unsubstituted phenoxy;

(R)$_n$ is n substitutents R, which can be, independently of one another, C$_1$-C$_4$alkyl, C$_1$-C$_4$alkoxy, halogen, sulfo, carboxyl, carbamoyl, N-C$_1$-C$_4$alkylcarbamoyl, N,N-di-C$_1$-C$_4$alkylcarbamoyl C$_1$-C$_4$alkylsulfonyl, sulfamoyl, N-C$_1$-C$_4$alkylsulfamoyl or N,N-di-C$_1$-C$_4$alkylsulfamoyl; n is 0, 1 or 2;

T is hydroxyl or C$_1$-C$_6$alkyl, which can be substituted by hydroxyl, carboxyl, sulfo, sulfato, chlorine, C$_1$-C$_4$alkoxy, carbamoyl, sulfamoyl or a radical of the formula

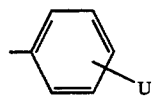

or

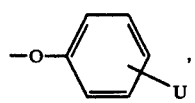

in which U is hydrogen, sulfo, sulfato, hydroxyl or carboxyl; or

T is a radical of the formula

in which

R$_3$ is hydrogen or substituted or unsubstituted C$_1$-C$_4$alkyl;

R$_4$ is hydrogen or C$_1$-C$_6$alkyl, which can be substituted by hydroxyl, carboxyl, sulfo, sulfato, chlorine, C$_1$-C$_4$alkoxy, carbamoyl, sulfamoyl or a radical of the formula (3a) or (3b), in which U is as defined;

X$_1$, X$_2$ and X$_3$ independently of one another are each a radical of the formula

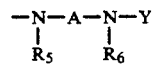

in which

R$_5$ and R$_6$ independently of one another are hydrogen or substituted or unsubstituted C$_1$-C$_4$alkyl;

A is C$_2$-C$_4$alkylene, which can be substituted by halogen, hydroxyl, carboxyl, sulfo, phenyl, sulfophenyl or C$_1$-C$_4$alkoxycarbonyl, or cyclohexylene, which can be substituted by C$_1$-C$_4$alkyl; or in which the group —N(R$_5$)—A—N(R$_6$)— is 1,4-piperazinediyl; and Y is a fiber-reactive halogenopyrimidine or halogenotriazine radical.

3. A reactive dye mixture according to claim 2, in which n is 0.

4. A reactive dye mixture according to claim 2, in which R$_1$ and R$_2$ are chlorine atoms.

5. A reactive dye mixture according to claim 2, in which T is a radical of the formula

| | |
|---|---|
| —CH$_2$—CH$_2$—OSO$_3$H | (6a), |
| —CH$_2$—CH$_2$—SO$_3$H | (6b), |
| —CH$_2$—CH$_2$—CH$_2$—OSO$_3$H | (6c) or |
| —CH$_2$—CH$_2$—CH$_2$—CH$_2$—OSO$_3$H | (6d). |

6. A reactive dye mixture according to claim 2, in which A is ethylene, 1,2-propylene, 1,3-propylene, 2-hydroxy-1,3-propylene, 2-sulfato-1,3-propylene, 1-phenyl-1,3-propylene, 2-phenyl-1,3-propylene, 2-(4'-sulfophenyl)-1,3-propylene, 2-methyl-1,3-propylene or 1,4-butylene.

7. A reactive dye mixture according to claim 6, in which A is ethylene, 1,2-propylene, 1,3-propylene or 2-sulfato-1,3-propylene.

8. A reactive dye mixture according to claim 2, in which $X_1$, $X_2$ and $X_3$ are each a radical of the formula

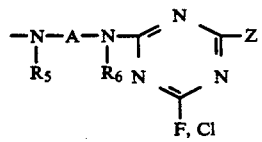 (7)

in which $R_5$, $R_6$ and A are as defined in claim 2 and Z is —$NH_2$, $C_1$–$C_4$alkylamino, which can be substituted by hydroxyl or sulfo, N,N-di-$C_1$–$C_4$alkylamino, which can be substituted by hydroxyl, phenylamino, which can be substituted by $C_1$–$C_4$alkyl, $C_1$–$C_4$alkoxy, halogen, hydroxyl, ureido, acetylamino, carboxyl, sulfo or sulfomethyl, N-$C_1$–$C_4$alkyl-N-phenylamino, which can be substituted in the alkyl radical by halogen, cyano, hydroxy, carboxyl, sulfo or sulfato and in the phenyl radical by $C_1$–$C_4$alkyl, $C_1$–$C_4$alkoxy, halogen, hydroxyl, ureido, acetylamino, carboxyl, sulfo or sulfomethyl, sulfonaphthylamino or morpholino.

9. A reactive dye mixture according to claim 8, in which $X_1$, $X_2$ and $X_3$ are each a radical of the formula

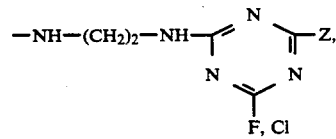 (8a)

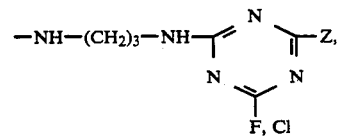 (8b)

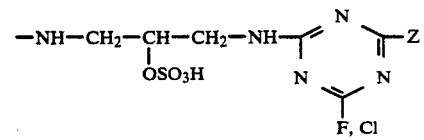 (8c)

or

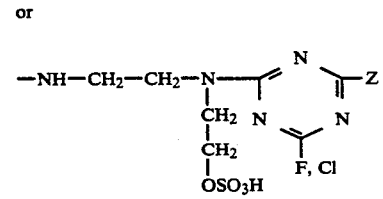 (8d)

in which Z is —$NH_2$, $C_1$–$C_4$alkylamino, which can be substituted by hydroxyl or sulfo, N,N-di-$C_1$–$C_4$alkylamino, which can be substituted by hydroxyl, phenylamino, which can be substituted by $C_1$–$C_4$alkyl, $C_1$–$C_4$alkoxy, halogen, hydroxyl, ureido, acetylamino, carboxyl, sulfo or sulfomethyl, N-$C_1$–$C_4$alkyl-N-phenylamino, which can be substituted in the alkyl radical by halogen, cyano, hydroxyl, carboxyl, sulfo or sulfato and in the phenyl radical by $C_1$–$C_4$alkyl, $C_1$–$C_4$alkoxy, halogen, hydroxyl, ureido, acetylamino, carboxyl, sulfo or sulfomethyl, sulfonaphthylamino or morpholino.

10. A reactive dye mixture according to claim 8, in which Z is a radical of the formula

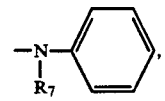 (9)

in which $R_7$ is hydrogen or $C_1$–$C_4$alkyl, which can be substituted by halogen, cyano, hydroxyl, carboxyl, sulfo or sulfato, and the phenyl ring can be substituted by methyl, methoxy, ethoxy, chlorine, hydroxyl, ureido, acetylamino, carboxyl or sulfo.

11. A reactive dye mixture according to claim 2, consisting essentially of the reactive dyes of the formulae

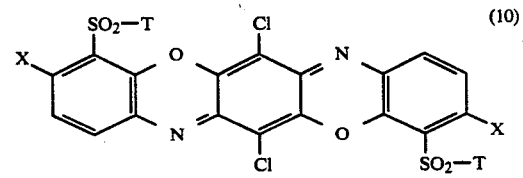 (10)

and

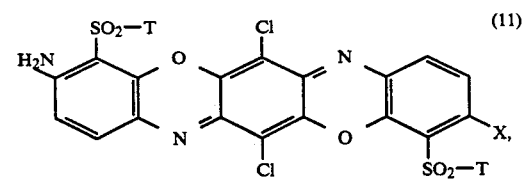 (11)

in which T is a radical of the formula

—$CH_2$—$CH_2$—$OSO_3H$ (6a),

—$CH_2$—$CH_2$—$SO_3H$ (6b),

—$CH_2$—$CH_2$—$CH_2$—$OSO_3H$ (6c) or

—$CH_2$—$CH_2$—$CH_2$—$CH_2$—$OSO_3H$ (6b), and X is a radical of the formula

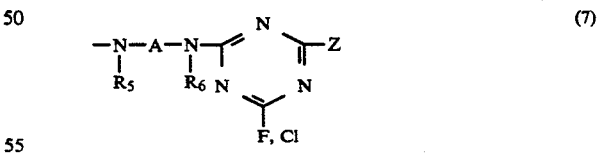 (7)

in which $R_5$, $R_6$ and A are as defined in claim 2 and Z is —$NH_2$, $C_1$–$C_4$alkylamino, which can be substituted by hydroxyl or sulfo, N,N-di-$C_1$–$C_4$alkylamino, which can be substituted by hydroxyl, phenylamino, which can be substituted by $C_1$–$C_4$alkyl, $C_1$–$C_4$alkoxy, halogen, hydroxyl, ureido, acetylamino, carboxyl, sulfo or sulfomethyl, N-$C_1$–$C_4$alkyl-N-phenylamino, which can be substituted in the alkyl radical by halogen, cyano, hydroxyl, carboxyl, sulfo or sulfato and in the phenyl radical by $C_1$–$C_4$alkyl, $C_1$–$C_4$alkoxy, halogen, hydroxyl, ureido, acetylamino, carboxyl, sulfo or sulfomethyl, sulfonaphthylamino or morpholino.

12. A reactive dye mixture according to claim 2, consisting essentially of the reactive dyes of the formulae

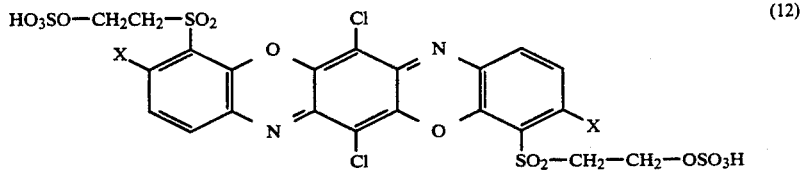
(10)

and

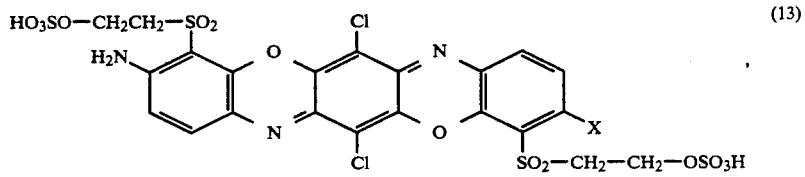

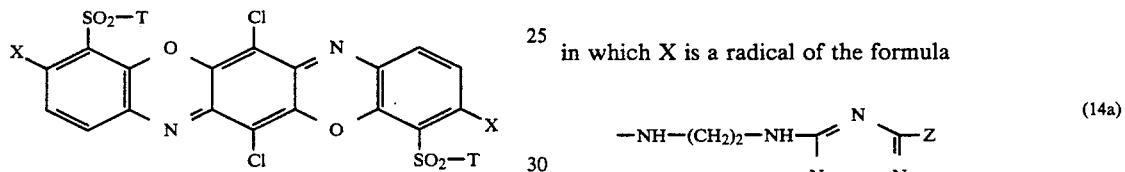
(11)

in which T is a radical of the formula $$—CH_2—CH_2—OSO_3H \quad (6a),$$
$$—CH_2—CH_2—SO_3H \quad (6b),$$
$$—CH_2—CH_2—CH_2—OSO_3H \quad (6c), \text{ or}$$
$$—CH_2—CH_2—CH_2—CH_2—OSO_3H \quad (6d),$$

and X is a radical of the formula

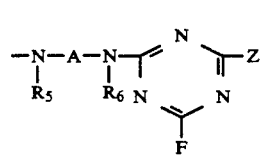
(7a)

in which $R_5$, $R_6$ and A are as defined in claim 2 and Z is —$NH_2$, $C_1$-$C_4$alkylamino, which can be substituted by hydroxyl or sulfo, N,N-di-$C_1$-$C_4$alkylamino, which can be substituted by hydroxyl, phenylamino, which can be substituted by $C_1$-$C_4$alkyl, $C_1$-$C_4$alkoxy, halogen, hydroxyl, ureido, acetylamino, carboxyl, sulfo or sulfomethyl, N-$C_1$-$C_4$alkyl-N-phenylamino, which can be substituted in the alkyl radical by halogen, cyano, hydroxyl, carboxyl, sulfo or sulfato and in the phenyl radical by $C_1$-$C_4$alkyl, $C_1$-$C_4$alkoxy, halogen, hydroxyl, ureido, acetylamino, carboxyl, sulfo or sulfomethyl, sulfonaphthylamino or morpholino.

13. A reactive dye mixture according to claim 12, consisting essentially of the reactive dyes of the formulae

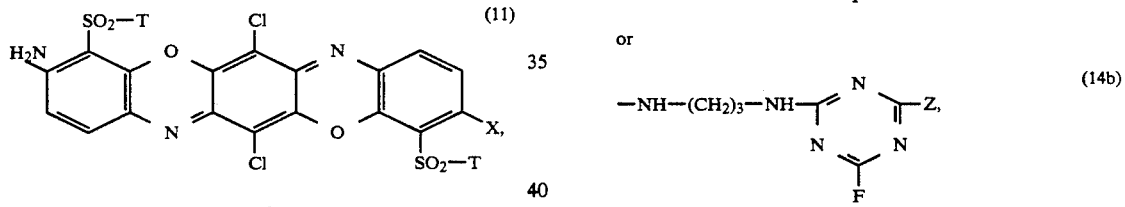
(12)

and (13)

in which X is a radical of the formula (14a)

or (14b)

and Z is β-sulfatoethylamino, m-sulfophenylamino, p-sulfophenylamino, 2,4-disulfophenylamino or 2,5-disulfophenylamino.

14. A process for the preparation of a reactive dye mixture according to claim 1, which comprises subjecting a compound of the formula

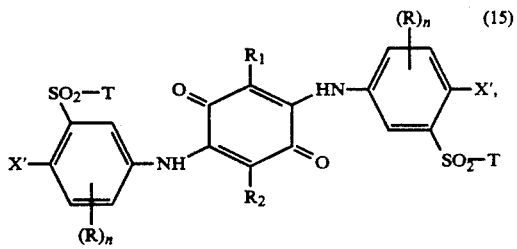
(15)

in which $R_1$, $R_2$, R, n and T are as defined in claim 1 and X' is a radical of the formula

(16)

in which A, $R_5$ and $R_6$ are as defined in claim 1, to a cyclisation reaction in oleum at elevated temperature, in which $R_1$, $R_2$, R, n and T are as defined in claim 1 and X' is a radical of the formula

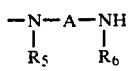 (16)

in which A, $R_5$ and $R_6$ are as defined in claim 1, to a cyclisation reaction in oleum at elevated temperature, and reacting the resulting mixture comprising the compounds of the formulae in which $R_1$, $R_2$, R, n, T and X' are as defined, with a fibre-reactive compound which contains a radical Y, in particular a compound of the formula Halogen-Y (19)₂ wherein Y is the radical of a halogenopyrimidine or halogenotriazine, so that a mixture of reactive dyes according to claim 1 is formed.

15. A process according to claim 14, wherein a compound of the formula

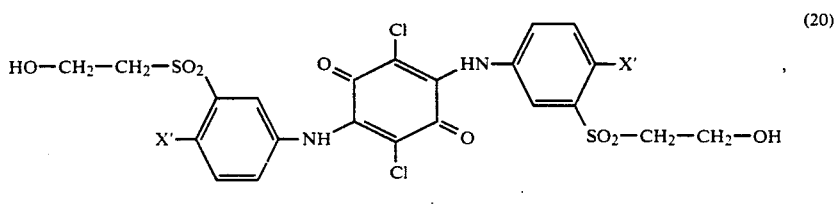

(20)

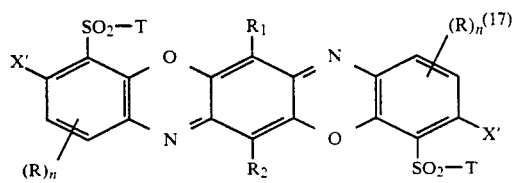

(17)

and

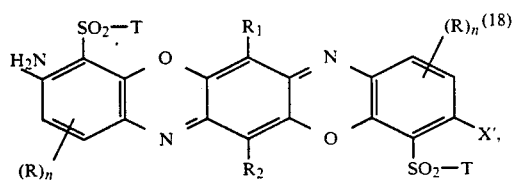

(18)

in which X' is a radical of the formula

—NH—(CH₂)₂—NH₂ (21a)

—NH—(CH₂)₃—NH₂ (21b)

is used as the starting substance, and the mixture comprising the compounds of the formulae

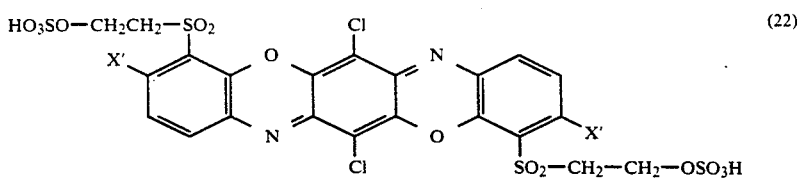

(22)

and

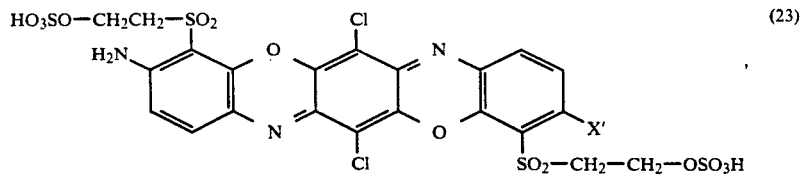

(23)

in which X' is as defined, obtained by cyclisation is subjected to a condensation reaction with a compound of the formula

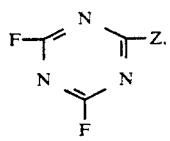

(24)

in which Z is β-sulfatoethylamino, m-sulfophenylamino, p-sulfophenylamino, 2,4-disulfophenylamino or 2,5-disulfophenylamino.

16. A method of dyeing or printing which comprises applying an effective amount of a reactive dye mixture according to claim 1 to a substrate selected from the group consisting of silk, leather, wool, polyamide, polyurethane and cellulosic fiber materials and blend fabrics having hydroxyl group-containing fibers.

17. A method of dyeing or printing which comprises applying an effective amount of a reactive dye mixture according to claim 1 to cellulose fibers.

* * * * *